United States Patent
Ball et al.

[11] Patent Number: 5,860,071
[45] Date of Patent: Jan. 12, 1999

[54] QUERYING AND NAVIGATING CHANGES IN WEB REPOSITORIES

[75] Inventors: Thomas J. Ball, Naperville, Ill.; Yih-Farn Robin Chen, Bridgewater, N.J.; Frederick Douglis, Somerset; Eleftherios Koutsofios, Chatham, both of N.J.

[73] Assignee: AT&T Corp, Middletown, N.J.

[21] Appl. No.: 797,756

[22] Filed: Feb. 7, 1997

Related U.S. Application Data

[60] Provisional application No. 60/012,151, Feb. 23, 1996.

[51] Int. Cl.$^6$ .................................................. G06F 17/30
[52] U.S. Cl. ............................................ 707/100; 707/102
[58] Field of Search ..................... 707/1–10, 100–104, 707/200–206, 503, 511, 531; 345/326–358, 431, 473; 705/10; 395/651, 500

[56] References Cited

U.S. PATENT DOCUMENTS

| | | | |
|---|---|---|---|
| 5,045,994 | 9/1991 | Belfer et al. | 395/500 |
| 5,297,249 | 3/1994 | Bernstein et al. | 345/356 |
| 5,303,146 | 4/1994 | Ammirato et al. | 707/503 |
| 5,499,180 | 3/1996 | Ammirato et al. | 707/503 |
| 5,557,515 | 9/1996 | Abbruzzese et al. | 705/9 |
| 5,568,639 | 10/1996 | Wilcox et al. | 707/200 |
| 5,572,643 | 11/1996 | Judson | 395/200.48 |
| 5,630,131 | 5/1997 | Palevich et al. | 395/701 |
| 5,644,692 | 7/1997 | Eick | 345/326 |
| 5,710,899 | 1/1998 | Eick | 345/339 |
| 5,737,619 | 4/1998 | Judson | 707/500 |

OTHER PUBLICATIONS

F. Douglis and T. Ball, "Tracking and Viewing Changes on the Web," *USENIX Technical Conference* –Jan. 22–26, 1996, San Diego, CA, pp. 165–176.

Y–F. R. Chen et al., "Ciao: A Graphical Navigator for Software and Document Repositories," Proceedings of the International Conference on Software Maintenance (ICSM), Opio, Nice, Oct. 17–20, 1995, *Institute of Electrical and Electronics Engineers*, Oct. 17, 1995, pp. 66–75.

*Primary Examiner*—Thomas G. Black
*Assistant Examiner*—Ruay Lian Ho

[57] ABSTRACT

A system and method is provided for identifying if a document linked from a base document has changed over time. A first time and a later second time are identified. A link in a base document is recursively identified, where the link refers to a linked document. A version repository is searched to determine if the repository stores versions of the linked document associated with the first and second times. An indication is provided to the user if it is determined that a version associated with the first time and a version associated with the second time are stored in the repository.

8 Claims, 8 Drawing Sheets

*HtmlDiff:* Here is the first difference. There are 9 differences on this page. ▶is old. ▶*is new.* ☐ /% for recursive diff.

☐ AIDE: ▲ % AIDE: AT&T Internet Difference Engine   ☐ Tom Ball's ☐ *HtmlDiff*

Description: AIDE is a tool that "remembers" HTTP pages for users and then uses *HtmlDiff* program to highlight changes to subsequent versions of the page. It is related to % *WebGUIDE*, which provides a graphical interface.

For more information, contact ▲ *%Fred Douglis*

FIG. 2B

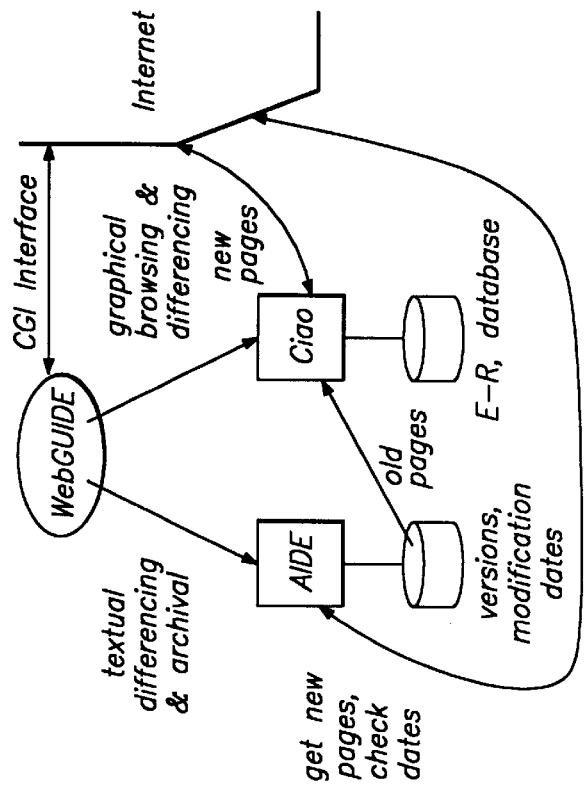

FIG. 3

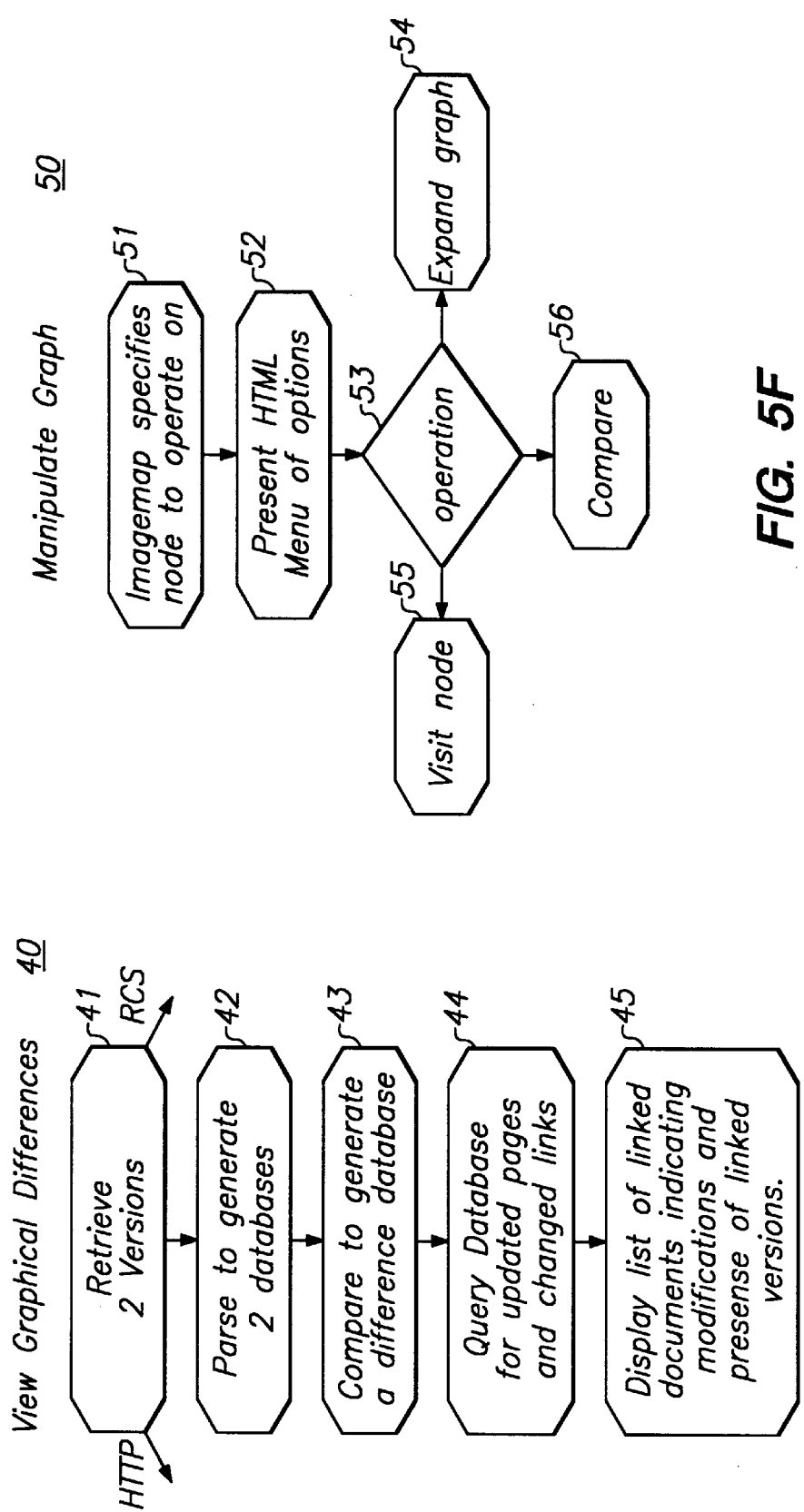

Changes on web page www.ibm.com (961018-961022):

Added URL links:
- IBM announces third quarter 1996 results: http://www.ibm.com/ibm/finance/3q96earnings.html
- Ashes to Ashes, Bits to Bits: Wandering through the Web's tombstone gardens, where even the dead can be flamed: http://www.ibm.com/OtherVoices/SalonInternet/September129618248.html
- Two new models rev up ThinkPad line: http://www.ibm.com/News/ls961016.html
- http://www.ibm.com/images/highlights/ov-cOcOcO-3.jpg: http://www.ibm.com/OtherVoices Deleted URL links:
- IBM Global Campus: Transforming higher education through the power of network computing: http://www.ibm.com/News/ls961010.html
- http://www.ibm.com/images/highlights/ov-cOcOcO-2.jpg: http://www.ibm.com/OtherVoices
- Of bagels,bicycles, and some new small business solutions: http://www.ibm.com/News/ls961009.html
- Security industry touts advances in airport screening devices: http://www.ibm.com/OtherVoices/CNN/September209632730.html Changed pages under root page www.ibm.com: click a red ball for recursive analysis.
- http://www.ibm.com/News/ls961016.html:
- http://www.ibm.com:
- http://www.ibm.com/index.html3:
- http://www.ibm.com/Assist:
- http://www.ibm.com/index.html2:
- http://www.ibm.com/Links/http%3a%21%2fwww%2einternet%2eibm%2ecom%2f:
- http://www.ibm.com/News/ls961010.html:
- http://www.ibm.com/Services:
- http://www.ibm.com/index.html:
- http://www.ibm.com/OtherVoices/SalonInternet/September129618248.html:
- http://www.ibm.com/OtherVoices/SalonInternet/lead_stories.html:
- http://www.ibm.com/News/Orders:
- http://www.ibm.com/News/ls961009.html:

*FIG. 6*

QUERYING AND NAVIGATING CHANGES IN WEB REPOSITORIES

This application claims the benefit of the provision application entitled Querying And Navigating Changes in World Wide Web Repositories filed Feb. 23, 1996 and having Ser. No. 60/012,151.

BACKGROUND OF THE INVENTION

The invention relates to a system for recursively tracking changes to pages or documents in a repository. The system can indicate on a text page whether links to other pages have been modified or whether the underlying linked pages have been modified. The system can also display how the linked structure of a document has been modified to more than one level of indirection. Each display format provides for dynamic extension of the document comparison to other documents in the repository linked to the base document.

Browsing and searching are popular ways to access and find information on the World Wide Web (WWW). The WWW is an example of a repository upon which the present invention acts, other repositories are discussed later. While GUI-based (Graphic User Interface) browsers and powerful search engines are now ubiquitous, tools and mechanisms that provide access to historical information and tracking of updates only have been developed recently and are not in widespread use. Search engines and browsers help users locate and inspect information of interest, while tracking tools help users to keep up-to-date on this pertinent information. WWW services and applications can benefit from a mechanism that tracks changes, maintains page version histories, and automatically computes differences. The usefulness of the tracking mechanism will be further increased by tools of the present invention for dealing with the vast number of documents on the Web, such as graphical views of pages with querying and filtering based on user-specified criteria and recursive tracking and viewing of changes to related Web documents.

We have combined and expanded upon two existing tools, Ciao and the AT&T Internet Difference Engine (AIDE), in order to provide two sorts of visual cues. The Web Graphical User Interface to a Difference Engine, or WebGUIDE is an implementation of the invention. Ciao displays high-level structural differences by displaying graphs showing the relationships between pages. The color of the nodes representing the pages indicates which pages have stayed the same, been modified or been deleted. The links between the pages are also represented to indicate any modifications. AIDE displays low-level textual differences by marking up changes between versions and modifying anchors to cause documents reached from that page to be annotated.

Fred Douglis and Thomas Ball invented the original AIDE system and filed patent application Ser. No. 08/549,359 on Oct. 27, 1995, which is incorporated in its entirety herein by reference. Additionally, Mr. Douglis and Mr. Ball published an article on the AIDE system entitled "An Internet Difference Engine And Its Applications", which is incorporated in its entirety herein by reference. The AIDE system highlighted the difference between two documents but was unable to support recursive document comparison. Thus, the prior system did not indicate whether a linked page had been modified or whether additional versions of the linked pages were stored so that a difference comparison could be run.

Yih-Farn Robin Chen, Eleftherios Koutsofios, Glenn Fowler and Ryan Wallach published an article on the original Ciao system entitled "Ciao: A Graphical Navigator for Software and Document Repositories", which is incorporated in its entirety herein by reference. This prior Ciao system did not support dynamic recursive document comparison. Dynamic recursion extends the database as new documents are encountered.

The AIDE and Ciao systems referred to in the following description are the versions which have been significantly modified and merged to form the present invention.

SUMMARY AND OBJECTS OF THE INVENTION

This system provides the means for a user to track changes in a document repository in an efficient manner. The user selects two dates to perform a comparison of a base document. The two versions of the base page are compared and the comparison determines if linked pages at the approximate time are available for comparison and whether the available pages have been modified. The invention also enables the user to view multiple levels of changes to linked pages in a repository. The user can display the structure of these linked pages in a graph or list format. Thus, the user does not have to jump from page to page within the repository to determine if lower level (more than one level of indirection from the base document) documents have been modified. The user can display the difference of any linked page for which an earlier version exists in the repository.

One object of the invention is to provide recursive differentiation of textual materials. The user is thus informed whether the difference function can operate on a linked page and whether the link Universal Resource Locator (URL) or the linked page has been modified between the two dates selected by the user. Often these dates are comparing the current version to the most previously viewed version of the document.

Another object of the invention is to provide a graphic representation of the links between documents in a repository and whether the links within the document and/or the linked documents have been modified. The scope and depth of the graph is determined by the query entered by the user.

Another object of the invention is to provide the user with the ability to manipulate documents from the graph. Linked documents can be compared by clicking on the representative node and selecting the compare function. Also, the links to a document can be dynamically expanded by using an existing node as a base page and running a query.

Another object of the invention is to provide a textual list which tracks which links within a document have been changed and whether any linked documents have been modified. The information is displayed as a list and provides information and functions similar to the graphic representation.

BRIEF DESCRIPTION OF THE DRAWINGS

The above, and other, objects, features and advantages of the present invention will be apparent from the following detailed description of the preferred embodiments when read in conjunction with the accompanying drawings in which corresponding parts are identified by like reference numerals.

FIGS. 2A and 2B are examples of different pages of output by the AIDE system of the present invention.

FIG. 3 is a system architecture overview of the present invention combining the modified AIDE and Ciao systems.

FIGS. 5A–F are flowcharts illustrating the interaction of the functions according to the present invention.

FIG. 6 is an illustration of an output from the list structural differences function of the present invention.

DETAILED DESCRIPTION OF THE PREFERRED EMBODIMENTS

The present invention is a tracking tool which provides a recursive comparison feature to inform the user if a linked document is available for comparison and if the document has been modified in the period between the date of the earlier version to the date of the later version. A Universal Resource Locator (URL) is the address of a page in the WWW, the page so addressed is referred to as a linked page. However, the present invention is not limited to comparisons of WWW pages but is meant to include documents from any repository which provides recursive support.

Two existing tools, Ciao and AIDE, have been modified and combined to form the system of the present invention to provide various ways for the user to view the available tracking information.

Ciao

Ciao is a customizable navigator that allows users to query and browse structural connections embedded in a document repository. Ciao involves three major components: an abstractor that converts source documents to a database according to a data model that describes the documents' internal structure, a repository that keeps versions of the documents and corresponding databases, and a graphical interface that allows users to query and visualize the information structure. Ciao has been instantiated for C, C++, ksh, Hyper Text Markup Language (HTML), and some business information repositories.

Figure 1:
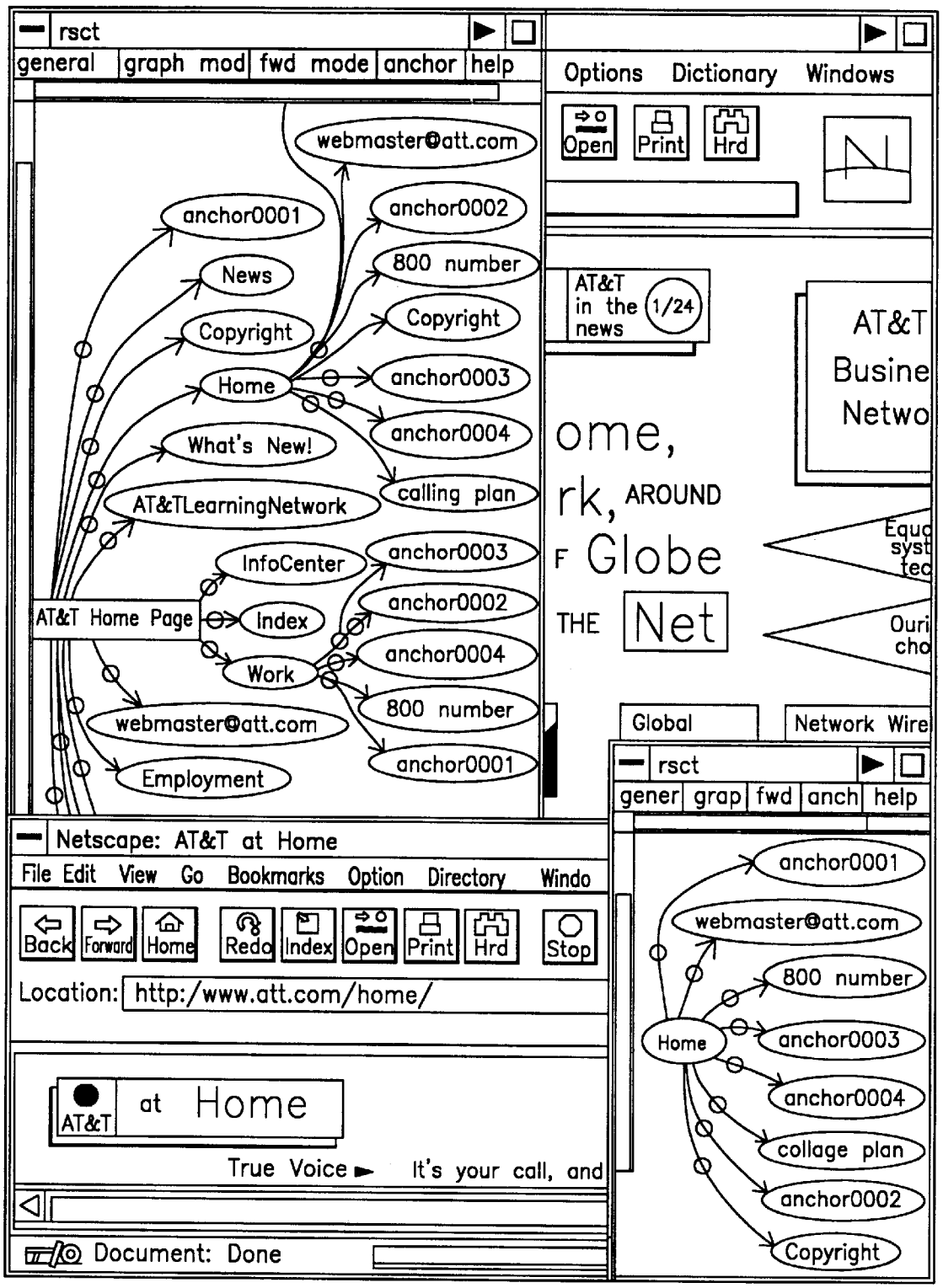
FIG. 1 is a graphic representation of the output from the Ciao-HTML system applied to the AT&T home page.

Ciao-HTML can be used to explore the structure of HTML documents. The data model for HTML includes entities such as HTML pages, anchors, headers, and images, and relationships among them. Unlike some other instantiations, Ciao-HTML database can expand in real time as the user tries to explore links to pages that are not currently incorporated in the database. FIG. 1 shows the output of Ciao-HTML applied to a version of the AT&T home page.

To arrive at the output in FIG. 1, the user entered a query to retrieve all relationships between the AT&T home page and its anchors to a depth of one level. That query resulted in the graph shown in the upper-left window. The user can expand any of the anchors, as shown for the Home and Work anchors, to show further link connections. The expanded graph sections can be separately displayed in another window if the graph becomes too complicated (in a manner similar to the clone feature of the Netscape Navigator web browser). An example of such a separate expanded graph is shown in the lower right corner of FIG. 1 with the Home node as the base node.

The user also visited two of the home pages by sending requests to the browser. All these operations were done through pop-up menus attached to the graph nodes. These query and navigation features of Ciao-HTML allow the user to browse complex Web structures comfortably.

Ciao-HTML runs as an external application on the user's machine, and interfaces with the browser by sending it commands to visit particular nodes. It retrieves and processes pages independently from the browser by relying on a proxy-caching server to ensure that the same pages are not fetched multiple times from off-site. Once a page is retrieved from the repository, any subsequent changes to that page in the external repository will not show up on a comparison unless that page is retrieved from off-site again.

AT&T Internet Difference Engine

The AT&T Internet Difference Engine (AIDE) combines notification of changes to pages on the Web with a customized view of what has changed in those pages. Notification of changes has become relatively commonplace, but viewing changes has not. AIDE supports this with a shared version repository, into which users "deposit" pages of interest when they have seen them, and a tool called HtmlDiff, which creates a page that highlights the differences between two versions of an HTML document. In addition to seeing the changes to a page since the user last viewed it, it is possible to see a history of versions and compare any pair of them. All archival and differencing is performed on a server, using Common Gateway Interface (CGI) scripts.

Figure 2A:

FIGS. 2A and 2B illustrate examples of the document output when AIDE performs a difference through the HtmlDiff operator. Bold italics indicate new text, struck-out text indicates deletions, and arrows point to either, including changes to URLs or modified linked pages, which are not otherwise highlighted. AIDE was specifically modified to determine and illustrate if two versions of a linked page are stored in the system from the approximate dates selected for the two versions of the base document. The above is an example of how modifications are indicated and it is understood to those skilled in the art that other means can be used to display any changes or modifications, such as icons or different colors.

Prior to the combination of the functionality of AIDE and Ciao to form the present invention, the only interface to AIDE was through simple HTML forms and anchors. Once the volume of pages tracked by a single user exceeds some threshold, or links are followed recursively, more sophisticated interfaces are necessary to provide visual feedback and navigational tools. The present invention provides these more sophisticated interfaces.

System Architecture

The preferred embodiment of the present invention is comprised of four components: a version and meta-data repository, a robot that tracks modifications, a difference engine, and a graph generator. While pieces of these components have been described elsewhere, the evolution of the components and their combination to form the present invention are discussed below.

The system architecture is depicted in FIG. 3. The system accesses the WWW or other repository through a CGI interface. The information retrieved by the AIDE and Ciao systems can be stored in separate databases, as shown in FIG. 3, or the two systems can share a database. Documents are stored in the AIDE database in Revision Control System (RCS) format to minimize the storage space required to maintain multiple versions of one document. Modification dates, which users have seen certain version and other document information are also stored in the AIDE database. Data models generated to describe a document's internal structure are stored in the Ciao Entity-Relationship database. Ciao accesses the AIDE database to compare versions of a page.

Repository

The AIDE version repository is a centralized service that archives multiple versions of selected pages. The system defaults to a condition where it only stores pages that a user explicitly requests. A user could specify a page that ultimately leads to many other pages, such as Yahoo, and thereby store multiple pages upon one request. Or the system can be arranged to store every document which the user retrieves from the WWW, like the Inktomi and Lycos search engines. This option is not preferred because of the potential for shortages in storage capacity caused by the needless storage of documents that will not be needed again.

Pages are stored in RCS format, so storing multiple versions does not result in excessive storage overhead as long as changes are relatively small. RCS format maintains one version history for each document regardless of the number of users who have saved that document. As an alternative, each page could be stored separately by each user to protect privacy concerns; however, this alternative generally requires substantial storage. Instead, AIDE tracks which versions of a page each user has viewed. Thus, it can be determined if the document has changed since a particular user last viewed the document rather than since any user last viewed the document.

In addition, AIDE maintains a relational database containing meta-data about each page, each user, and the relationship between them. For each page, it stores the following, among other, information:

Last modification date
  This date is used to find pages that have been modified since a user last saw them or to determine which pages contain new information.
Last check
  The time when the last modification data was obtained is used to determine when the page should next be checked by the automatic polling program.
Checksum
  The checksum is used to determine if a document has been modified between the two dates selected by the user. The checksum is often used when the last modification date is unavailable.
History
  Information about archived versions, including the date and the RCS version number is stored to provide easy access to a selected document version.
Frequency of checks
  Different users may request different minimum frequencies to check a page; this number represents the minimum across all users.

For each user, the database contains global information, such as e-mail addresses, and information for each page. For each user, page combination, the database stores the following, among other, information:

Last time viewed
  The last time a user viewed a page through AIDE is saved. Of course, if the user views the page directly, AIDE has no way of knowing this unless AIDE has access to her history file.
History
  AIDE keeps a history of which versions the user has viewed, which is a subset of all versions recorded for a particular page.
Minimum frequency of checks
  Set by the user to determine how often the page should be checked. The system often has a maximum polling frequency that one can select, such as one hour.

Notification method
  Most changes to pages will be reported upon request by a user by invoking a CGI script, but in some cases the user may request e-mail notification. In addition, for those pages that are reported together, a priority can cause them to be ordered to call attention to some more than others. This is similar to Tapestry, which orders e-mail and netnews postings based on user criteria.
Auto-archive
  The user can specify that a page should be archived every time a change is detected, or versions can be archived only upon explicit request of the user.
Depth
  The depth indicates how many levels of hyperlinks to follow when checking for modifications and archiving versions. Typically it will be zero.
Tracking Modifications
  The robot periodically checks pages for updates. It queries the database for all pages that have not been checked within their minimum polling frequency. For pages that are to be checked recursively, the polling frequency for links may be less than the base page.

AIDE need not check pages that are "known" to be new. If every user who has expressed an interest in a page has already been told a page has been modified, and has not visited the page through AIDE or viewed its differences, the page need not be checked again with the same frequency.

The time of each check is recorded in the database, as well as the new modification time. Modified pages are reported to interested users immediately if requested. The new page is archived automatically if specified by any user.

HTML Differencing And Recursion
  Originally, differencing was done only on a per-page basis, with no notion of recursion. That mode is useful when most pages are checked in isolation, but less so when pages are tracked recursively. Now, one can visit a page with links to modified pages and have those links highlighted. By following the link, HtmlDiff is invoked recursively on the new page, and its links are similarly highlighted. HtmlDiff is a tool which compares two versions of a document and outputs a third document containing information indicating a change between the two versions. Thus, one can see the differences between a set of related pages from any points of time that its contents have been archived.

The recursive comparison interface works as follows. The user selects two versions of an HTML document for comparison. The two timestamps associated with these documents define the time range for future document comparison as the user browses. When HtmlDiff compares two documents, it gathers up all the linked pages in the document and queries the version repository to determine if there are different versions of the documents specified by the address of the linked page (its URL) for the two dates. Once the earlier version of the page has been found, the invention performs a preliminary check, based on information such as the dates of modification and/or the checksums to determine if the page has been modified. Since dates of modification and checksums can provide false indications of change, the system can be designed to operate an HtmlDiff to compare the two versions to determine if they have been modified. However, this last technique is presently too burdensome and time consuming for common usage.

If an earlier version is stored in the repository, an icon is inserted before the hypertext link in the output document. The icon is itself a hypertext link that transfers control back to AIDE in order to compare the two versions of the document. If the output document indicates that two versions of a linked page exist, the user can click or otherwise select the corresponding icon to compare the contents and links contained in the linked pages.

Clearly, the effectiveness of recursive comparison depends on the quantity of historical information in the version repository. Many addresses will not have any page history and will not be filtered. Other page addresses may have historical information, but not for the exact dates specified for recursive comparison. In the latter case, we make a number of approximations in order to provide more comparative information. Suppose that the current date is Apr. 1, 1996, that the user asks for version comparison between the dates Sep. 20, 1995 and Mar. 6, 1996, and that for a given URL, linked page versions exist for Oct. 30, 1995, Jan. 1, 1996, and Mar. 10, 1996. In this case, we use the dates closest to those specified (up to some epsilon interval), so the comparison will use the Oct. 30, 1995 and Mar. 10, 1996 versions. For another linked page, there may only be a version stored for Oct. 15, 1995. In that case, we compare the stored version and the current version on the WWW. The epsilon interval used for date approximation may be user-specified or pre-set by the system manager.

Recursive HTML comparison allows users to see that a hypertext link points to a page for which there are changes. However, this only works well for one level of indirection. If the currently viewed page and a changed page are separated by a long chain of unchanged pages, it is bothersome to force the user to step through the unchanged pages to get to the differences. The Ciao graphical interface addresses this problem by providing a graphical overview of the changed pages, allowing the user to quickly navigate to changed pages. A text list analogous to the graph can also be displayed to provide similar information.

Graph generator

The graphical view of relationships between pages of interest to a user, and their states, could be generated in a number of ways. The present invention generates graphs on the fly as embedded images, using a tool, such as "webdot." The images can be clickable, so clicking on a node can invoke another operation. Unfortunately, image maps do not currently support operations other than selecting a page based on location within the image, unlike an external application which can enable the user to click on a node and directly access the menu. Ciao and WebMap are examples of such external applications. WebMap is a graphical hypertext navigation tool described by P. Domel at the 1994 Second International WWW Conference. Instead, the user selects a page and the selected page provides the menu and enables the selection of an operation. This indirect method is used in the instant invention and supports several operations, such as:

Visiting the page represented by the node.

Showing the differences between the current version of the page and the previous version saved by the user.

Remembering the page represented by the node by storing the page on disk in RCS format and updating the node's version history.

Performing a Ciao query to dynamically modify the graph, for instance, to select nodes matching some criteria.

Another approach would be a helper application that would run on a user's machine, external to the browser. This option is complicated by the need to interact with a database and CGI services on another machine, rather than being self-contained and requires that the user install an external software package, such as a Netscape Navigator plug-in. A third approach would be to provide full interactive access to the graph using a language such as Java.

System Operation

Following is a description of a user's interaction with the system of the present invention to query and navigate changes in a repository, such as the WWW. This description demonstrates how the components of AIDE and Ciao are combined seamlessly to provide effective browsing, searching, archiving, and differencing capabilities, all under a simple visual interface.

Figure 5A:
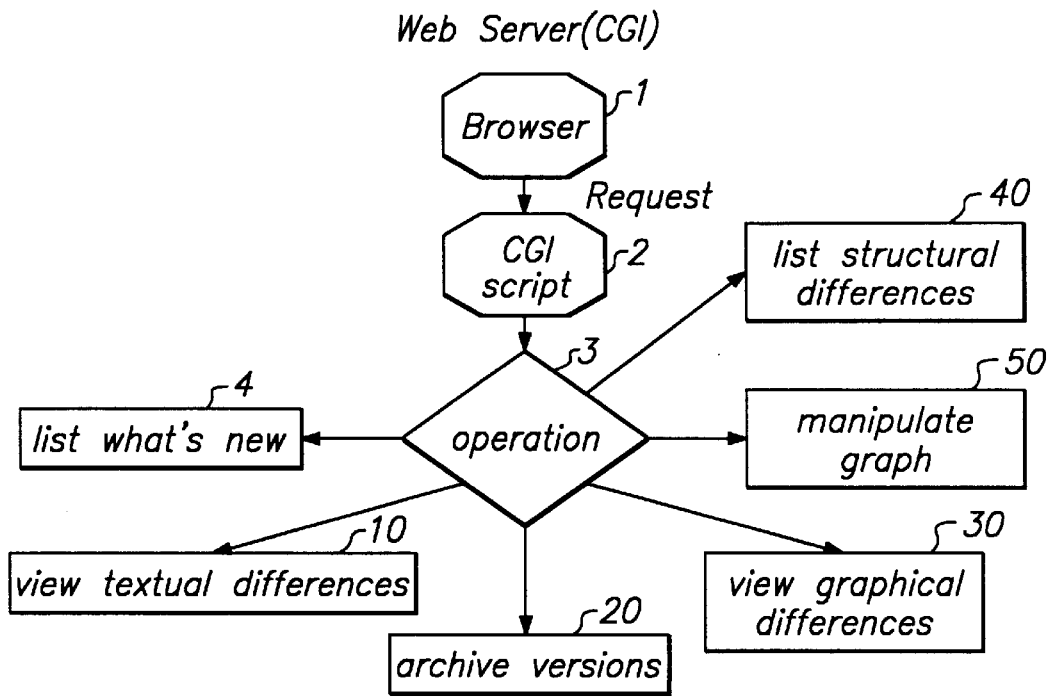
Figure 5B:
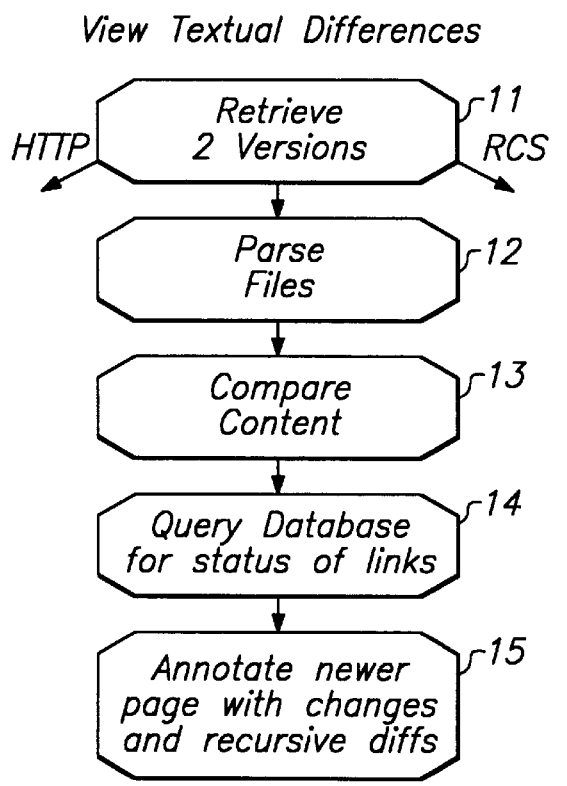
Figure 5D:
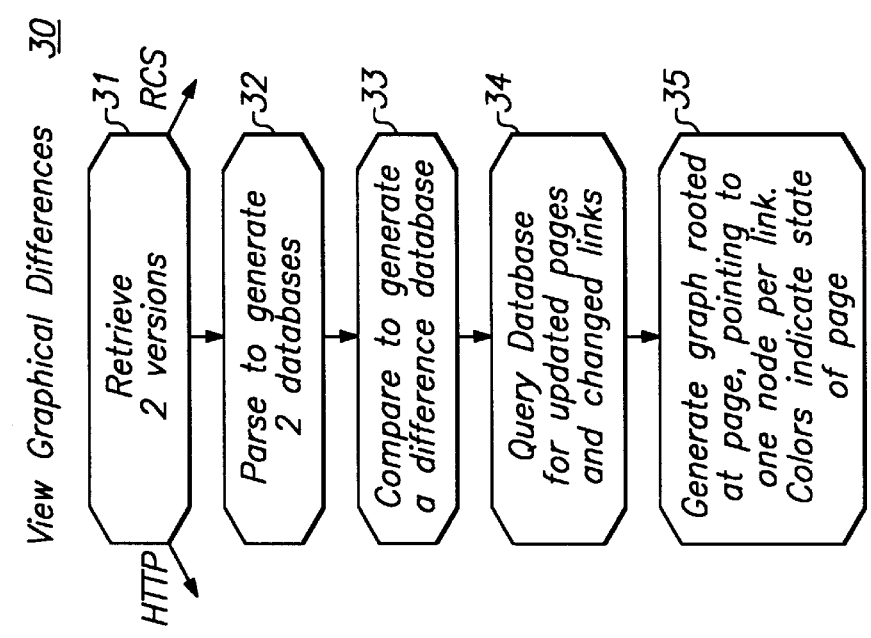

The user visits the home page of the present invention to view the history of http:// www.att.com. The history of that site is accessed through a standard form-based interface and a history list showing all available versions is sent back. The page is retrieved and displayed through the interaction of the system, the CGI interface and the browser in steps 1–3 in FIG. 5A. The retrieved page and its linked pages are temporarily stored in the system cache. The user can select an option, such as list what's new, step 4, view textual differences, step 10, archive versions, step 20, view graphical differences, step 30, list structural differences, step 40, and manipulative graph, step 50. These options can also be selected prior to retrieving a document from an external repository. List what's new in step 4 provides the user with a complete list, from the documents he or she is following, of those documents which have been newly modified. The list can be determined by comparing the dates of modification, the checksums or the two versions in a difference operation.

View textual differences, step 10, is provided through AIDE. The user picks two versions to compare, such as "version 1.24" and "version 1.23" which are retrieved from the appropriate repository in step 11. Each version is temporarily stored in the system cache while the difference is performed. Each file is parsed in step 12 to determine its structure. Html documents have structure which regular text documents do not contain. Parsing the document's structure eases the comparison burden, which is performed in step 13 by HtmlDiff. Of course, the difference operation can be performed by any other program implementing similar functions to HtmlDiff, especially if the documents come from an external repository other than the WWW and are stored in a format other than html.

In step 13, the contents of the two documents are compared, including a comparison of the links to determine if any links have been added or deleted. In step 14, the system checks the various URL's to determine if two versions of the linked documents are stored in the AIDE database for the selected time frame. The two versions of the linked document or the documents' header information is also compared in step 14 to determine if the linked document has been modified. The comparison of the linked documents is discussed above. In step 15, the output document is formed with the system designated annotations indicating changes to the text, the links and the linked documents as well as an indication of whether two versions of each linked document are stored in the database to operate a difference.

The user could also select archive versions in step 20. The current documents can be archived by storing them in the AIDE database. Alternatively, the user can enter a query, specifying a base document and a recursion depth in step 41. The first linked document is retrieved in step 42. Upon user request or by designation, the document can be stored in RCS format in step 43.

In step 44, it is determined if the query will recurse another level. If yes, then the content of the base document is parsed in step 45 and the linked documents are retrieved in step 46. These newly retrieved documents are now the current recursion level and can be stored in RCS format as discussed above. If the query does not call for any more recursive levels, then the system returns the user to step 3.

The user can also select to view graphical differences in step 30 through Ciao. In step 31, the system reconstructs the documents from the RCS repository or retrieves the current version from the external repository. These documents are temporarily stored as discussed above for the AIDE system. The difference operation is then handed over to Ciao at step 32. The Ciao-HTML abstractor is invoked to create a database for each home document in step 32. These databases are temporarily stored in the Ciao Entity-Relationship database, and are deleted after a period of non-use. These databases can contain information from more than one level of indirection.

In step 33, the difference engine invokes the Ciao difference (dbdiff) operator to compute the difference database, including whether any of the links have been added or deleted from the base document. In step 34, the system determines if two versions of each linked document are stored for the selected timeframe in the database. Then the linked documents are checked to determine if they have been modified. The linked documents are checked by calling the AIDE database to check the header information or to determine the content of the individual documents. The Ciao database contains the structural entity-relationship data. The document modifications are thus determined in the manner discussed above for AIDE. However, the presence of two versions of a linked document can be determined from information stored in the Ciao database.

In step 35, the graph generator sends back the embedded image graph, which was computed from the difference database to show the connections between the AT&T home page and other anchors, highlighting the additions, deletions, and changes of nodes and edges. The graph gives us a high level view on structural changes which have occurred in the AT&T home page since the last visit, assuming version 1.24 is the current version. A comparison can also be conducted between two versions of the home page stored in memory.

Figure 4:
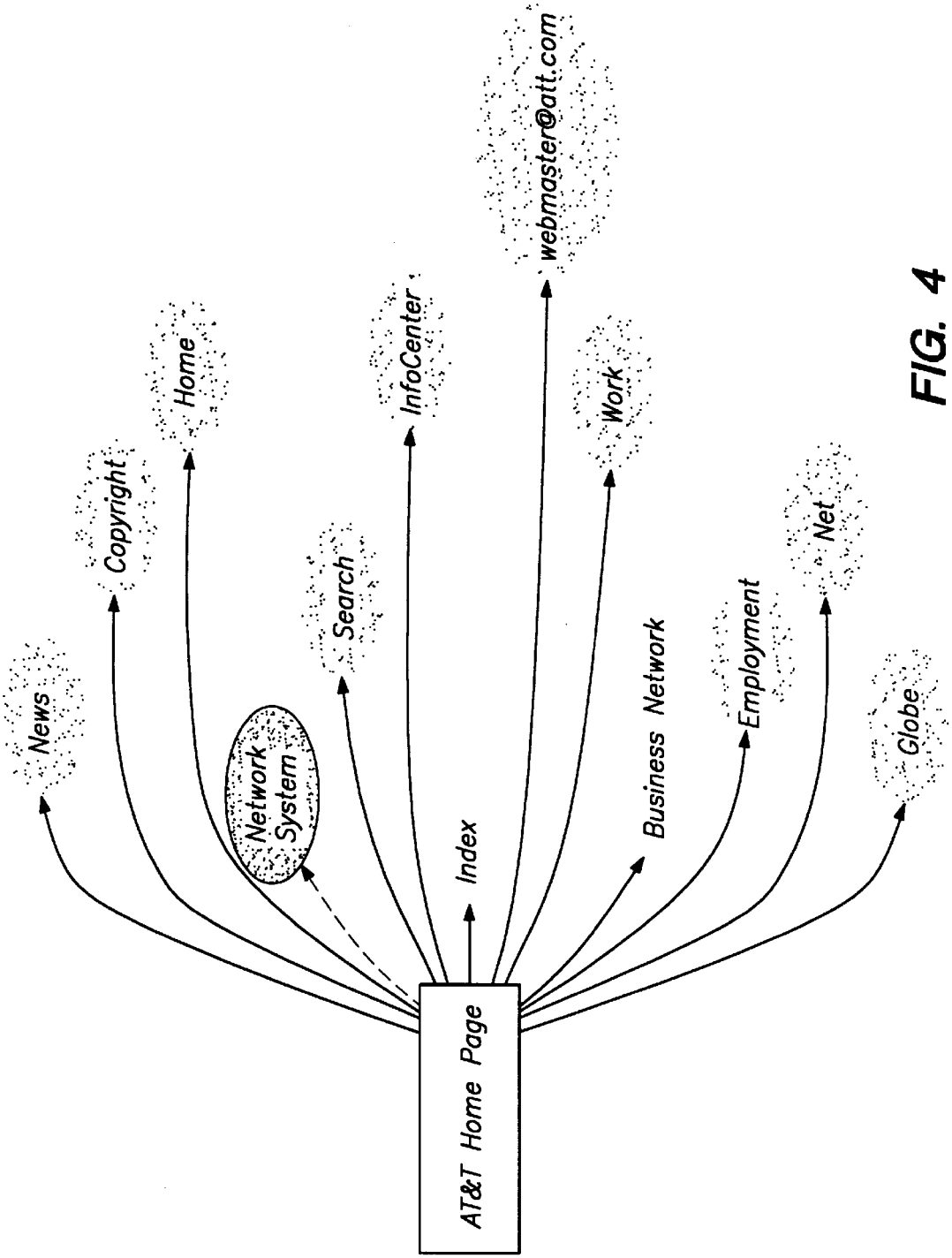
FIG. 4 is a graphic representation of the difference graph produced by the Ciao system of the present invention.

FIG. 4 shows a graphical difference generated by the present invention for the AT&T home pages from Nov. 28, 1995 and Jan. 23, 1996. The base document is a rectangle node and the anchors are oval nodes. Yellow nodes indicate that the corresponding documents have been changed, red ones are new anchors, white ones are deleted anchors, and light-blue ones are those anchors that remain the same (colors are shown as shades of grey in FIG. 4). Similarly, dashed lines indicate new links, dotted lines indicate deleted links, and solid lines are those links that remain intact.

From the graphic interface, the user may elect to invoke HtmlDiff on the AT&T home page to see detailed text changes or the user may expand the query using a new node, which he or she is particularly interested in, as the base node. The former operation calls AIDE and function as described above, while the latter operation calls Ciao to perform the steps described above from the new node, as discussed above with respect to FIG. 1. Steps 51–56 of FIG. 5F, illustrate the steps necessary to manipulate nodes of the graph. In step 51 the user clicks on a node to call up its menu. The menu is displayed in step 52 with the list of options. The user can then select an option, such as visit the node in step 55, expand the graph in step 54, compare the two versions of the document, if available, in step 56.

Figure 5C:
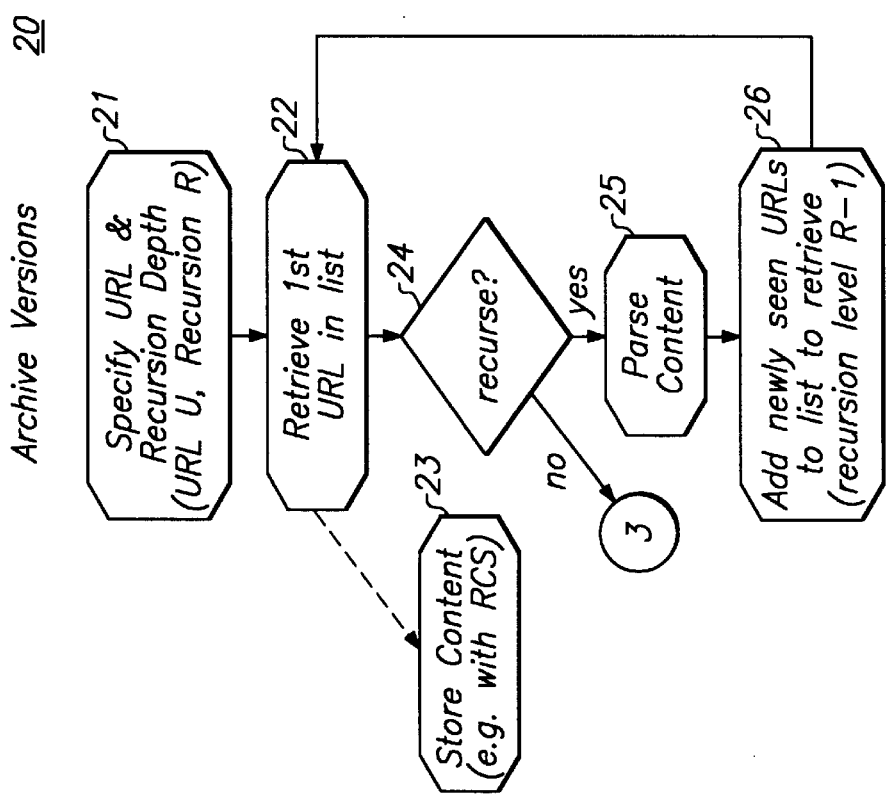

In step 40, the user can select to list structural differences. The steps for viewing the list of differences, steps 41–45 of FIG. 5E, are the same as stated for steps 31–35 of FIG. 5C, except the data is displayed in a different format. The list provides an indented lists of documents, as shown in FIG. 6, to indicate the level of recursion.

The display format requires a special indication when more than one document refers to the same document and when a document refers back to a document from a previous level of recursion. Symbols and icons are used to indicate whether the links or the linked documents have been modified. As above, an indication is also provided to inform the user whether two versions from the selected time frames are stored in the system database. Alternatively colors or other distinguishing means can be used to indicate traits of documents. The graph manipulations can also be conducted on the list, since the underlying steps are the same.

Having described the preferred embodiments of the invention with reference to the accompanying drawings, it is to be understood that the invention is not limited to those precise embodiments and that various changes and modifications could be effected therein by one skilled in the art without departing from the spirit and scope of the invention as defined in the appended claims.

We claim:

1. A method for identifying changes in a linked document, comprising the steps of:

a. identifying a time t1 and a later time t2;
   b. recursively identifying a link in a base document, said link referring to a linked document;
   c. searching a version repository to determine if the repository stores versions of the linked document associated with times t1 and t2; and
   d. indicating to the user if the version repository stores versions of the linked document associated with times t1 and t2.

2. The method of claim 1, wherein a plurality of versions of the linked documents are stored in the version repository, each version of the linked document is associated with a time, and the version of the linked document associated with a time T is the version of the linked document that is associated with a time that is nearest to time T.

3. The method of claim 1, wherein a plurality of versions of the linked documents are stored in the version repository, each version of the linked document is associated with a time, and the version of the linked document associated with a time T is the version of the linked document that is associated with a time that is nearest to time T and within an epsilon interval period of time to time T.

4. The method of claim 1, wherein the level of recursion in step b is determined by a user.

5. The method of claim 1, further comprising the steps of determining if there are differences between the linked document version associated with time t1 and the version associated with time t2, and if there are differences, then showing at least part of the differences to the user.

6. The method of claim 5, wherein the step of determining if there are differences between the linked document version associated with time t1 and the version associated with time t2 includes the step of comparing status information for each version that reflects the date on which the linked document was last modified.

7. The method of claim 5, wherein the step of determining if there are differences between the linked document version associated with time t1 and the version associated with time t2 includes the step of comparing the document checksums of the two versions.

8. A system for identifying changes in a linked document, comprising:

a. means for identifying a time t1 and a later time t2;

b. means for recursively identifying a link in a base document, said link referring to a linked document;

c. a version repository;

d. means for searching said version repository to determine if said repository stores versions of the linked document associated with times t1 and t2; and e. means for indicating to the user if said version repository stores versions of the linked document associated with times t1 and t2.

* * * * *